(12) United States Patent
Nedez

(10) Patent No.: US 7,625,430 B2
(45) Date of Patent: Dec. 1, 2009

(54) USE OF ALUMINAS AS CAPTURE MASS FOR ORGANOMETALLIC SILICON COMPLEXES

(75) Inventor: Christophe Nedez, Salindres (FR)

(73) Assignee: IFP, Rueil Malmaison Cedex (FR)

( * ) Notice: Subject to any disclaimer, the term of this patent is extended or adjusted under 35 U.S.C. 154(b) by 237 days.

(21) Appl. No.: 11/907,817

(22) Filed: Oct. 17, 2007

(65) Prior Publication Data

US 2008/0092738 A1    Apr. 24, 2008

(30) Foreign Application Priority Data

Oct. 18, 2006    (FR)    .................................. 06 09197

(51) Int. Cl.
*B01J 20/08*    (2006.01)
*B01D 15/00*    (2006.01)
*C10G 25/00*    (2006.01)

(52) U.S. Cl. ........................... 95/141; 95/900; 210/690; 423/245.1; 502/415; 208/300; 585/820

(58) Field of Classification Search ................... 95/141, 95/900; 210/660, 679, 690; 423/210, 245.1; 502/415; 208/251 R, 299, 300; 585/820
See application file for complete search history.

(56) References Cited

U.S. PATENT DOCUMENTS

| 4,645,587 A | | 2/1987 | Kokayeff | |
|---|---|---|---|---|
| 4,747,937 A | * | 5/1988 | Hilfman et al. | .......... 208/251 R |
| 5,744,420 A | * | 4/1998 | Le Loarer et al. | ............ 502/415 |
| 5,756,791 A | * | 5/1998 | Nedez et al. | ................... 556/42 |
| 6,159,898 A | | 12/2000 | Kanazirev | |
| 6,183,719 B1 | * | 2/2001 | Muller et al. | ................ 423/625 |
| 6,413,434 B1 | | 7/2002 | Nedez | |
| 2004/0054091 A1 | | 3/2004 | Diaz et al. | |
| 2004/0134350 A1 | | 7/2004 | Christophe | |
| 2006/0225571 A1 | | 10/2006 | Higgins | |

FOREIGN PATENT DOCUMENTS

| JP | 59-162122 A | 9/1984 |
|---|---|---|
| JP | 60-222144 A | 11/1985 |
| JP | 09-085087 A | 3/1997 |
| WO | WO 99/40999 A1 | 8/1999 |
| WO | WO 02/081047 A1 | 10/2002 |
| WO | WO 2006/104801 A2 | 10/2006 |

* cited by examiner

*Primary Examiner*—Frank M Lawrence
(74) *Attorney, Agent, or Firm*—Millen, White, Zelano & Branigan, P.C.

(57) ABSTRACT

The present invention concerns a process for capturing organosiliceous complexes in the gaseous or liquid phase on a solid containing at least 80% by weight of alumina after calcining at 1000° C. The alumina has a total pore volume of more than 30 ml/100 g, a fraction of the pore volume in pores with a diameter of 70 Å or more of more than 10 ml/100 g and a specific surface area of more than 10 m²/g.

15 Claims, 1 Drawing Sheet

USE OF ALUMINAS AS CAPTURE MASS FOR ORGANOMETALLIC SILICON COMPLEXES

The present invention relates to a process employing capture masses for organometallic silicon complexes. Such complexes may be found in gaseous or liquid streams which generally then pass over a catalyst. If the catalyst is not protected, it may then be poisoned and its performance (activity and/or selectivity) will drop prematurely.

The feed for the process of the invention may be a gasoline cut, preferably a gasoline cut from a cracking unit, and more preferably a gasoline deriving mainly from a catalytic cracking unit. The treated gasoline may also be a mixture of gasolines from different conversion processes such as steam cracking, coking or visbreaking processes, or even gasolines which are directly derived from the distillation of petroleum products.

Silicon often acts a primary poison in a number of catalytic applications (hydrogenation, Prime G+, etc). Experiments have shown that rather than speaking of silicon in general, a distinction must be made between different types of silicon:
- silicon which is termed mineral silicon, often the result of the presence of debris from refractory beads. It is physically present but does not appear to affect the activity or selectivity of the catalyst concerned;
- silicon which is normally termed organic silicon, deriving from organometallic complexes which may react with a catalyst placed downstream and poison it irreversibly. The upstream addition of antifoaming agents, often based on polysiloxanes, appears to play a major role in this phenomenon.

We have shown that using an alumina can effectively retain organosiliceous complexes at its surface by reactive adsorption. We then showed that particular aluminas can advantageously be used, namely those demonstrating a superior capture potential for said complexes.

Throughout the text, the amounts are expressed as a % by weight and ppm by weight.

Thus, the invention concerns a process for capturing organosiliceous complexes in the gaseous or liquid phase on a solid containing at least 80% by weight of alumina after calcining at 1000° C. The total pore volume (TPV) of the alumina is more than 30 ml/100 g, preferably more than 45 ml/100 g, more preferably more than 50 ml/100 g, and still more preferably more than 55 ml/100 g.

The fraction of the pore volume found in pores with a diameter of 70 Å or more (hereinafter termed $V_{70Å}$) is more than 10 ml/100 g, preferably more than 15 ml/100 g, more preferably more than 25 ml/100 g, still more preferably more than 35 ml/100 g, highly preferably more than 45 ml/100 g or even more than 55 ml/100 g.

The alumina has a specific surface area of more than 10 $m^2/g$, preferably more than 20 $m^2/g$, more preferably more than 30 $m^2/g$ and even more than 50 $m^2/g$ or even more than 70 $m^2/g$.

Problems with gum formation resulting from unwanted polymerization may occasionally be observed under certain catalyst operating conditions, and so also in their protective capture mass. For this reason, in a particular implementation of the invention, the specific surface area may be less than 300 $m^2/g$, preferably less than 200 $m^2/g$, more preferably less than 150 $m^2/g$.

The powder used as a starting material for preparing alumina may be obtained by conventional processes such as the gel precipitation process or by rapid dehydration of an alumina hydroxide such as hydrargillite. The alumina may then undergo a drying operation and optional calcining; this latter operation may, for example, be carried out at a temperature between 200° C. and 1200° C., preferably between 300° C. and 1000° C.

The alumina may be in any of the normal forms known to the skilled person: powder, beads, extrudates, crushed material, monolith, etc. Beads and extrudates are preferred. The size of the beads (corresponding to the diameter of the beads) is thus in the range 0.5 to 10 mm, preferably in the range 0.7 to 8 mm, more preferably in the range 0.8 to 5 mm. The extrudates may be cylindrical or polylobed, solid or hollow in shape. Their size (corresponding to their length) is in the range 0.5 to 5 mm, preferably in the range 0.7 to 3 mm. It should be noted that the term "size" means diameter for beads and length for extrudates. More generally, the term "size" s applied to the largest dimension of the form under consideration.

When using alumina beads, they may be obtained by shaping, by drop coagulation, of a suspension or aqueous dispersion of alumina or a solution of a basic aluminium salt in the form of an emulsion constituted by an organic phase, an aqueous phase and a surface agent or an emulsifier.

Alumina beads may also be obtained by agglomeration of an alumina powder by rotary techniques such as a rotary pelletizer or a rotary drum. Beads can then be obtained with controlled dimensions and pore distributions, the whole generally being generated during the agglomeration step.

The alumina extrudates may be obtained by milling then extruding an alumina-based material, said material possibly being obtained by the rapid dehydration of hydrargillite and/or the precipitation of one or more alumina gels.

Following forming, the alumina may undergo various operations to improve its mechanical properties, such as maturation by holding it in an atmosphere with a controlled humidity followed by calcining, then optionally by impregnating the alumina using a solution of one or more mineral and/or organic acids, and a hydrothermal treatment in a confined atmosphere. In general, after the treatments, the alumina is dried and calcined.

In a particular implementation of the invention, the alumina may be doped with one or more elements selected from the group constituted by the alkalis, alkaline-earths and rare earths. The total content by weight of said doping elements is less than 20% by weight, preferably less than 10% by weight and more preferably in the range 500 ppm by weight to 5% by weight. The dopants may be added before, during and/or after the shaping operation.

In the case of doping with a cumulative amount of promoter elements exceeding 5000 ppm by weight, the total pore volume of the adsorbent is more than 30 ml/100 g, more preferably more than 35 ml/100 g, for a specific surface area of more than 20 $m^2/g$, preferably in the range 30 to 300 $m^2/g$, more preferably in the range 30 to 200 $m^2/g$. The $V_{70Å}$ is more than 10 ml/100 g, preferably more than 15 ml/100 g, more preferably more than 25 ml/100 g, still more preferably more than 35 ml/100 g, still more preferably more than 45 ml/100 g, or even more than 55 ml/100 g.

Preferred dopants are sodium, potassium, calcium, magnesium and lanthanum. More preferably, sodium and lanthanum are selected. Highly preferably, lanthanum is selected.

The following examples illustrate the invention without, however, limiting its scope.

EXAMPLE 1

The reaction was carried out in a 600 ml volume beaker containing the working solution and protected from the ambient atmosphere by a watch glass surrounded by paraffin. The solids were studied as is (thus without crushing) and rested in the beaker on a tripod to avoid any unwanted wear by the magnetic stirrer. All of the experiments were carried out at ambient temperature under atmospheric pressure. The organometallic complex was polymethylhydrosiloxane $((CH_3)_3SiO[(CH_3)HSiO]_nSi(CH_3)_3)$; it was dissolved in cyclohexane.

The reactions were carried out on 6.3 g of solid at ambient temperature and atmospheric pressure, with a solution of 200 ml of cyclohexane containing 5000 ppm by weight of polymethylhydrosiloxane.

Each point corresponded to one experiment, analysis being carried out on the solid by ICP (inductively coupled plasma) using the addition method.

ICP was carried out as follows: the sample was dissolved by rapid acid attack using a $H_2SO_4$—$H_3PO_4$ mixture on a heated plate. The peak selected to carry out the ICP measurement was at λ=288.158 nm.

The addition method consisted of making identical samples of the sample to be analyzed, adding to each increasing concentrations of the element to be assayed. An increasing calibration scale was obtained with the same matrix and a constant final volume. Sample analysis produced a calibration curve. The intersection of this curve with the abscissa determined the origin of that axis and, as a result, the concentration of the element in the sample.

The titer of the solution was also monitored by gravimetric analysis: the material balances obtained were in agreement. Attack of a solid sample tested in a sealed tube then analyzed gravimetrically produced a result very close to that given by ICP.

Gravimetric analysis of the silicon was carried out following attack with hydrofluoric acid. By evaporating the solution containing an excess of hydrofluoric acid, all of the silica could be eliminated and the amount of silicon could be determined by difference.

The aluminas employed in this study are shown in Table I and the results obtained are given in FIGS. 1 and 2.

TABLE I

Characteristics of study aluminas

| | Alumina | | | | | |
|---|---|---|---|---|---|---|
| | A | B | C | D | E | F |
| Form | Beads | Beads | Beads | Extrudates | Beads | Beads |
| Diameter (mm) | 2-5 | 2-4 | 1.8-3.15 | 1.2 | 2-5 | 2-5 |
| Specific surface area m²/g | 332 | 73 | 189 | 275 | 321 | 341 |
| Total pore volume (ml/100 g) | 39.7 | 63.9 | 66.7 | 64.2 | 43.2 | 42.7 |
| $V_{70Å}$ (ml/100 g) | 23.4 | 60.9 | 62.5 | 53.5 | 6.1 | 30.9 |

Figure 1:
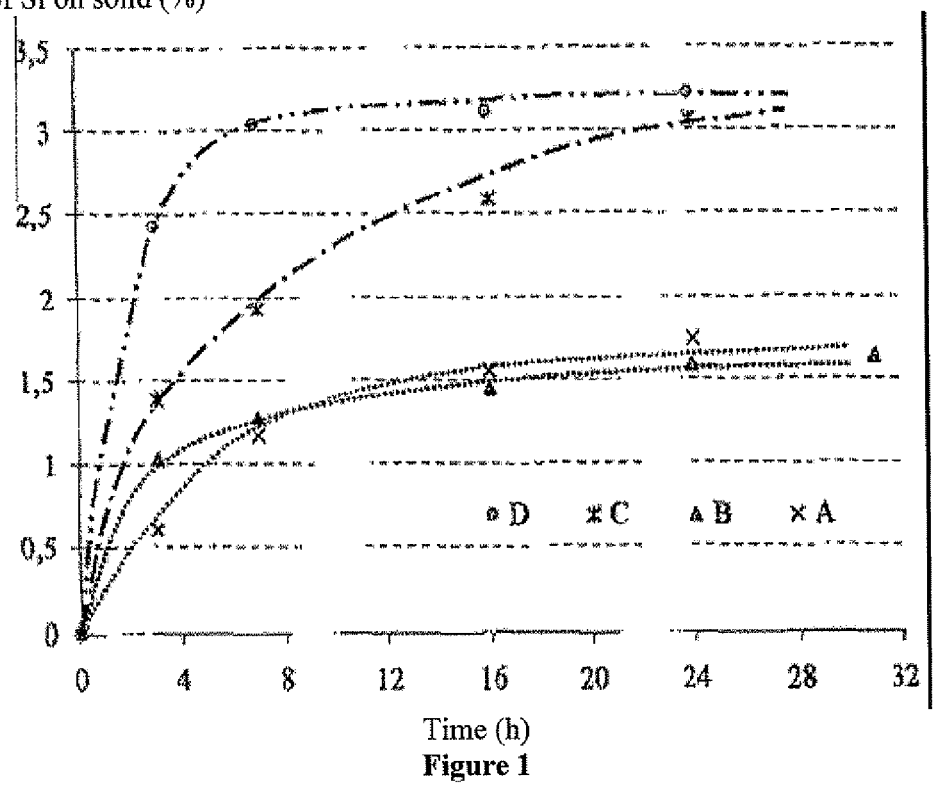
FIG. 1 is a graph illustrating the amount of silicon (as a % by weight) analyzed in the various solids as a function of the time for exposure to the solution.
Figure 2:
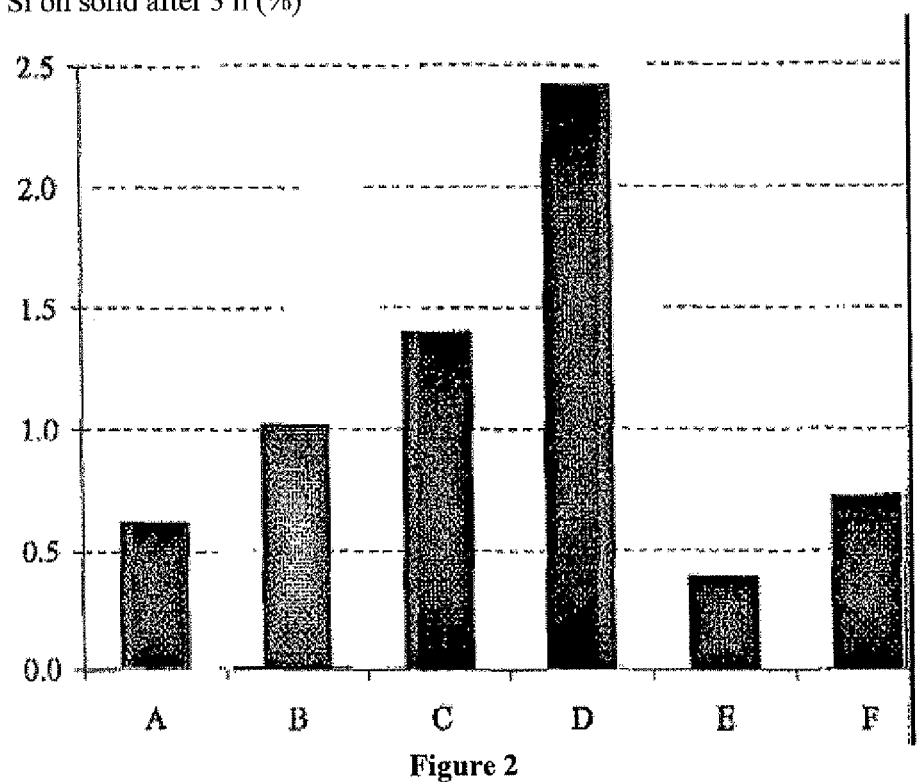
FIG. 2 is a bar graph showing the amount of silicon (as a % by weight) analyzed in the various solids after 3 hours of reaction.

It appears from FIG. 2 that the capture mass E (not in accordance with the invention) had a $V_{70Å}$ of 6.1 ml/100 g, and was less effective in capturing silicon than capture masses A to D and F (in accordance with the invention).

EXAMPLE 2

Doping of Alumina

Aluminas G and H resulted from dry impregnation, after forming, of alumina A, respectively with sodium hydroxide and lanthanum nitrate. After calcining at 450° C., G and H had respective $Na_2O$ and $La_2O_3$ contents of 2.1% by weight and 0.9% by weight. When tested under the same conditions as the other aluminas (Example 1), after 3 hours of reaction G and H showed 0.75% by weight and 0.82% by weight of captured silicon respectively.

Alumina I resulted from dry impregnation, after forming, of alumina F with sodium hydroxide. After calcining at 450° C., I had a $Na_2O$ content of 1.7% by weight. When tested under the same conditions as the other aluminas discussed above (Example 1), after 3 hours of reaction I showed 0.91% by weight of captured silicon.

The preceding examples can be repeated with similar success by substituting the generically or specifically described reactants and/or operating conditions of this invention for those used in the preceding examples.

The entire disclosures of all applications, patents and publications, cited herein and of corresponding French application No. 06/09197, filed Oct. 18, 2005 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for capturing, in the gaseous or liquid phase, organosiliceous complexes present in a gasoline cut comprising contacting a solid with said gasoline cut, said solid containing at least 80% by weight of alumina after calcining at 1000° C., said alumina having a total pore volume of more than 30 ml/100 g, a fraction of the pore volume found in pores with a diameter of at least 70 Å of being more than 10 ml/100 g, and said alumina having a specific surface area of more than 10 m²/g.

2. A process according to claim 1, in which the alumina has a total pore volume of more than 45 ml/100 g.

3. A process according to claim 1, in which the alumina has a volume represented by pores with a diameter of at least 70 Å or more of more than 25 ml/100 g.

4. A process according to claim 1, in which the alumina has a specific surface area of more than 20 m²/g.

5. A process according to claim 1, in which the alumina has a specific surface area in the range of 70 m²/g to 200 m²/g.

6. A process according to claim 1, in which the alumina has a volume represented by pores with a diameter of at least 70 Å or more of more than 45 ml/100 g.

7. A process according to claim 1, in which the alumina is doped with one or more elements selected from alkalis, alkaline-earths and rare earths, the total amount of said doping elements being less than 20% by weight.

8. A process according to claim 7, in which the alumina is doped with one or more elements selected from sodium, potassium, calcium, magnesium and lanthanum.

9. A process according to claim 8, in which the dopant is lanthanum.

10. A process according to claim 1, in which the alumina is in the form of beads or extrudates.

11. A process according to claim 10, in which the alumina is in the form of beads with a size in the range 0.5 to 10 mm.

12. A process according to claim 10, in which the alumina is in the form of extrudates with a size in the range 0.5 to 5 mm.

13. A process according to claim 2, in which the alumina has a specific surface area of more than 20 $m^2/g$.

14. A process according to claim 13, in which the alumina has a specific surface area in the range of 70 $m^2/g$ to 200 $m^2/g$.

15. A process according to claim 14, in which the alumina has a volume represented by pores with a diameter of at least 70 Å or more of more than 45 ml/100 g.

* * * * *